United States Patent Office 3,457,203
Patented July 22, 1969

3,457,203
HYDROPHILIC POLYURETHANE FOAMS AND A PROCESS FOR PREPARING THEM
Stanley I. Cohen, Orange, and John E. Puig, Wallingford, Conn., assignors to Olin Mathieson Chemical Corporation, a corporation of Virginia
No Drawing. Filed Apr. 25, 1966, Ser. No. 544,857
Int. Cl. C08g 22/14, 22/46
U.S. Cl. 260—2.5                    2 Claims

ABSTRACT OF THE DISCLOSURE

Hydrophilic polyurethane foams are prepared by reacting in a one-shot technique a polyether polyol containing at least 10 percent by weight of oxythylene substituents and a water soluble oxyethylated monofunctional compound such as oxyethylated nonyl phenol with an organic polyisocyanate in the presence of a liquid foaming agent, a reaction catalyst, and a silicone surfactant.

---

This invention relates to hydrophilic polyurethane foams and to a process for preparing them.

Polyurethane foams prepared by conventional techniques, i.e., reaction of a polyether polyol and an organic isocyanate in the presence of a suitable catalyst and foaming agent, are hydrophobic in nature and are not readily wetted by water. As a result of this shortcoming, urethane foams have not captured any sizable portion of the sponge market or other markets where soft, absorbent, resilient hydrophilic materials are desired.

One attempt to impart hydrophilic properties to urethane foams involves impregnating polyurethane foams with a material having hydrophilic properties such as polyacrolein. Although this technique has some effect upon imparting hydrophilic properties to polyurethane foam, disadvantages of this process include the following:

(1) the impregnation step adds an additional expense to the cost of preparing the foam;
(2) it is difficult to uniformly impregnate the urethane foam with the hydrophilic agent; and
(3) the hydrophilic agent has a tendency to be leached from the urethane foam after frequent contact with liquid, which results in a significant decrease in the hydrophilic properties.

There is a need for a simple economic technique for rendering urethane foam hydrophilic in order that this relatively inexpensive material can be utilized more fully.

Another problem encounted in the flexible polyurethane foam industry is how to increase the properties of ethylene oxide employed in preparing polyurethane foams. Although ethylene oxide is considerably cheaper than propylene oxide and other 1,2-oxides, it is not normally employed for this purpose because polyether polyols containing a high proportion of ethylene oxide are frequently solid at ambient temperatures and are thus difficult to handle and react in foaming processes. In addition, foaming is difficult with this type of polyether, and if it can be effected at all, the resulting foam is generally of poor quality.

There is a need in the flexible urethane foam industry for a process which employs a polyether polyol containing a high proportion of oxyethylene groups.

It is a primary object of this invention to provide novel hydrophilic urethane foams.

A further object of this invention is to provide an improved process for preparing hydrophilic urethane foams.

Still another object of this invention is to provide a novel process for preparing flexible urethane foams from polyether polyols containing relatively large proportions of oxyethylene substituents in their composition.

A further object of this invention is to provide novel flexible polyurethane foams containing relatively large proportions of oxythylene substituents in their composition.

These and other objects of the invention will be apparent from the following detailed description thereof.

It has now been discovered that the foregoing objects are accomplished when an organic polyisocyanate is reacted with a polyether polyol containing oxyethylene substituents and with a surfactant compound of the type described more fully below in the presence of a catalyst and a foaming agent. The resulting polyurethane foam is flexible and has good hydrophilic properties.

The polyether polyol reactant is one formed by reacting ethylene oxide, and, if desired, another alkylene oxide with a reactive hydrogen compound having from two to about six reactive hydrogen atoms and having not over six carbon atoms per molecule, and being selected from the group consisting of aliphatic polyhydric alcohols, alkylene amines, alkylene polyamines, cyclic amines, amides, and polycarboxylic acids. Aliphatic, polyhydric alcohols constitute one class of reactive hydrogen compounds that is especially useful in preparing the compositions of this invention. Such alcohols can have from about 2 to 6, inclusive, carbon atoms per molecule, and examples of these materials are ethylene glycol, pentaerythritol, methyl glucoside, propylene glycol, 2,3-butylene glycol, 1,3-butylene glycol, 1,5-pentanediol, 1,6-hexanediol, glycerol, trimethylolpropane, sorbitol, sucrose and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acetamide, succinamide and benzenesulfonamide. A still further class of such reactive hydrogen compounds is the di- and polycarboxylic acids, such as adipic acid, succinic acid, glutaric acid, aconitric acid, diglycollic acid, and the like. It will be recognized that the reactive hydrogen compound can be one containing different functional groups having reactive hydrogen atoms, also, such a citric acid, glycollic acid, ethanolamine, and the like. Still other such reactive hydrogen compounds can also be used so long as the particular compound meets the requirement set forth, i.e., relatively low molecular weight, reactivity with ethylene oxide and at least 2 reactive hydrogen atoms.

Sufficient ethylene oxide is reacted with the reactive hydrogen compound to provide between about 10 and about 100, and preferably between about 30 and about 50 percent by weight of the total oxyalkylated portion of the polyether polyol. The remainder of the oxyalkylated portion of the polyether polyol, if there is a remainder, may be derived from other lower alkylene oxides such as propylene oxide, butylene oxide, glycidol, mixtures thereof, and the like. Also, sufficient ethylene oxide, and other alkylene oxides, when employed, are reacted with the reactive hydrogen compound to form a polyether polyol having a molecular weight in the range between about 1000 and about 6000, and preferably between about 2000 and about 4000. The ethylene oxide component may be present in the polyether polyol as a block, or randomly distributed, or as a topping, or any combination of these.

Any monofunctional oxyethylated compound having one reactive hydrogen capable of reacting with an isocyanate moiety to form a urethane may be employed as a reactant in the process of this invention. It is preferred to employ a water soluble surfactant compound having a cloud point above 0° C. The surfactant has a hydrophobic component and a hydrophilic component. The hydrophobic component is derived from aliphatic alcohols, aliphatic mercaptans, aliphatic amines, fatty acids and alkyl phenols, each of which contain between about 8 and about 18 carbon atoms. Compounds useful for this purpose include dodecyl alcohol, tetradecyl alcohol, cetyl alcohol, and the corresponding mercaptans and amines, octyl phenol, dodecyl phenol, nonyl phenol, isomers thereof, mixtures thereof, and the like. The hydrophilic component of the surfactant is derived from ethylene oxide. Sufficient ethylene oxide is reacted with the hydrophobic component to form a surfactant compound having a cloud point above 0° C. The proportion necessary to effect this will depend upon the molecular weight and other properties of the hydrophobic component. However, when nonyl phenol is employed as the hydrophobic component, reacting between about 6 and 35 moles of ethylene oxide per mole of nonyl phenol and preferably between about 7 and about 15 moles in the presence of a basic catalyst affords satisfactory surfactant compounds for this invention. Greater or lesser proportions of ethylene oxide may be used if desired. The term "surfactant compound" is used throughout the description and claims to identify the above described water soluble surfactant compound.

The proportion of surfactant compound employed in preparing the urethane foams of this invention is generally in the range between about 5 and about 40 parts by weight per 100 parts by weight of the ethylene oxide-containing polyether polyol and preferably between about 20 and about 35 parts per 100. The surfactant compound and polyether polyol may be "premixed" in these proportions to afford a urethane foam forming reactant or else each component may be added separately when forming the foam.

Because of the high reactivity of the ethylene oxide-containing polyether polyol, a polyisocyanate of relatively low reactivity may be used in preparing the polyether foams of this invention, if desired.

Any organic polyisocyanate may be employed in the preparation of the polyurethane foams, including diisocyanates, triisocyanates, and polyisocyanates. Organic diisocyanates are preferred due to commercial availability, especially mixtures of isomers of tolylene diisocyanate such as those containing 80 percent by weight of 2,4-tolylene diisocyanate and 20 percent by weight of the 2,6-isomer, or 65 percent by weight of the 2,4- and 35 percent by weight of the 2,6-isomer. Other typical isocyanates include, but are not limited to, the following: methylene-bis-(4-phenyl isocyanate), 3,3'-bitolylene-4,4'-diisocyanate, 3,3'-dimethoxy - 4,4'-biphenylene diisocyanate, naphthalene-1,5-diisocyanate, hexamethylene diisocyanate, 1,4-phenylene diisocyanate, polyphenylene polymethylene isocyanate, and the like. The amount of isocyanate employed in the preparation of the polyurethane foams should be sufficient to provide at least about 0.7 NCO group per hydroxyl group present in the reaction system. This includes the number of hydroxyl groups present in the ethylene oxide-containing polyether polyol and surfactant compound of the present invention, the number of hydroxyl groups in any additives employed, and the number of hydroxyl groups employed in the foaming agent. An excess of isocyanate compound may be conveniently employed; however, this is generally undesirable due to the high cost of the isocyanate compound. It is preferable, therefore, to employ sufficient isocyanate to provide no greater than about 1.5 NCO groups per hydroxyl group, and preferably between about 0.9 and 1.1 NCO groups per hydroxyl group.

The polyurethane foams are prepared in the presence of a foaming agent, reaction catalyst, and preferably a small proportion of a conventional silicone surfactant. The foaming agent employed may be any of those known to be useful for this purpose, such as water, which is preferred, as well as the halogenated hydrocarbons, and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, and carbon tetrachloride. The amount of foaming agent employed may be varied within a wide range. Generally, however, the halogenated hydrocarbons are employed in an amount from 1 to 50 parts by weight per 100 parts by weight of the polyether polyol of the present invention, and generally water is employed in an amount of from 0.1 to 10 parts by weight per 100 parts by weight of the polyether polyol.

The polyurethane foams are prepared in the presence of a catalytic amount of a reaction catalyst. The catalyst employed may be any of the catalysts known to be useful for this purpose, or mixture thereof, including tertiary amines and metallic salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Generally speaking, the catalyst is employed in an amount ranging between about 0.05 and about 1.0, and preferably between about 0.075 and about 0.15 percent by weight of the polyether polyol.

Various additives may be employed in the preparation of polyurethane foams in order to achieve particular properties. Such additives include, but are not limited to, the following: monocarboxylic acids, polycarboxylic acids, polyesters, monohydroxy compounds, polyhydroxy compounds, and the like.

It is preferred in the preparation of the polyurethane compounds of the present invention to employ minor amounts of a conventional surfactant in order to further improve the cell structure of the polyurethane foam. Typical of such surfactants are the silicone oils and soaps. Generally up to 2 parts by weight of the surfactant is employed per 100 parts of the polyether polyol. This addition supplements the aforesaid "surfactant compound."

Various additives can be employed which serve to provide different properties, e.g. fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

These components are reacted in the customary "one-shot" manner to yield a urethane foam which is water-wettable and which has a significantly higher water-retention capability than conventional polyurethane foams. However, if desired, the "prepolymer" technique, and "quasi" prepolymer technique may also be employed to prepare the novel foams of this invention.

Applications for hydropholic urethane foams of this invention include household sponges, sponges and cleaning devices for other uses, disposable diapers, rollers for water-base paint, cartridges for absorption of urine, feminine personal products, applicators for deodorants, make-up and similar preparations and disposable cleaning and wiping uses.

The following examples are presented to illustrate the invention more fully without any intention of being limited thereby. All parts and percentages are by weight unless otherwise specified.

EXAMPLES 1-4

An ethylene oxide-containing polyether polyol was prepared by reacting glycerin with ethylene oxide in the presence of potassium hydroxide to yield oxyethylated glycerin having a molecular weight of about 1219. This compound was then reacted with propylene oxide in the presence of potassium hydroxide to a molecular weight of approximately 3000. The resulting polyether polyol contained about 40 percent of ethylene oxide and 60 percent of propylene oxide.

An oxyethylated nonyl phenol was prepared by reacting nonyl phenol with ethylene oxide in the presence of potassium hydroxide to yield a reaction product containing nine moles of ethylene oxide per mole nonyl phenol.

The polyether polyol and oxyethylated nonyl phenol prepared as described above were admixed with a catalyst (stannous octoate), another catalyst (triethylene diamine), a conventional surfactant (silicone oil), a foaming agent (water), and toluene diisocyanate in the following proportions to yield flexible polyurethane foams having good hydrophilic properties.

Foams prepared from these components had very good hydrophilic properties as determined in accordance with the following test. One test to determine the hydrophilic property is the "water pick-up," in grams of water per cubic inch of foam. This property was obtained by thoroughly working a 1" x 3" x 5" piece of the foam to be tested under the surface of distilled water to insure complete penetration. The foam sample was then lifted from the water, allowed to drain for 15 seconds, dropped into a tared cup and weighed. The net weight of the sample was determined and divided by the volume of the foam. The water pick-up property thus determined for each sample is presented below in Table II.

Another measure of hydrophilicity is the wipeability of the foam, which is determined by placing 10 cc. of water on a Lucite surface and then moving a pre-moistened, completely wrung piece of foam, 1" x 3" x 5", across the water on the Lucite surface without depressing the foam, in order that removal of the water from the Lucite surface is obtained by wetting the sponge rather than by suction due to pressure on the foam. The appearance of the Lucite surface was then estimated based upon the quantity of water remaining.

For purposes of comparison, a comparative test, hereinafter referred to as C-1, was made in which a cellulose sponge was tested in the same manner as the polyurethane foams of this invention. Another comparative test, hereinafter referred to as C-2, was made in which a conventional polyurethane foam prepared from a polyether polyol containing no oxyethylated portion was submitted to the same test. The properties of these foams are presented below in Table II.

The results show that the novel polyurethane foams of this invention as demonstrated in Examples 1-4 have hydrophilic properties which compare favorably with conventional cellulose sponge (C-1) and which are superior to a conventional polyurethane foam (C-2).

TABLE I

| Component | Parts by weight | | | |
|---|---|---|---|---|
| | Ex. 1 | Ex. 2 | Ex. 3 | Ex. 4 |
| Polyether polyol | 100 | 100 | 100 | 60 |
| Oxyalkylated tripentaerythritol [1] | 0 | 0 | 0 | 10 |
| Oxyethylated nonyl phenol | 30 | 10 | 20 | 30 |
| Stannous octoate | 0.09 | 0.05 | 0.05 | 0.065 |
| Triethylene diamine (33 percent in dioctyl phthalate) | 0.50 | 0.5 | 0.5 | 0.5 |
| Silicone oil surfactant [2] | 1.5 | 1.5 | 1.5 | 2.0 |
| Water | 4.0 | 4.0 | 4.0 | 4.0 |
| Toluene diisocyanate (80-20 of 2,4 and 2,6-isomers) | 47 | 44 | 44 | 49.0 |

[1] Reaction product of tripentaerythritol with ethylene oxide and propylene oxide in a EO:PO weight ratio of 50:50, hydroxyl number of about 27.
[2] A block copolymer of a dimethyl polysiloxane and a polyalkylene oxide.

TABLE II

| Property | Ex. 1 | Ex. 2 | Ex. 3 | Ex. 4 | C-1 | C-2 |
|---|---|---|---|---|---|---|
| Density, lbs. per cubic foot | 2.35 | 2.0 | 2.18 | | 2.8 | 1.34 |
| Water pickup, grams of water per cubic inch of foam | 7.4 | 12.2 | 8.2 | 10 | 12 | 6.2 |
| Wipeability | ([1]) | Fair | ([1]) | Good | Good | ([2]) |

[1] Fairly good.  [2] Very poor.

EXAMPLES 5-7

The procedure of Examples 1-4 was repeated with the exception that the polyether polyol was a copolymer of ethylene oxide and propylene oxide having a hydroxyl number of 65 and containing approximately 50 percent by weight of ethylene oxide. In addition, in Examples 6 and 7 an oxypropylated glycerin having a hydroxyl number of 56.1 and a molecular weight of 3,000 was also employed in the proportion indicated. The hydrophilic properties as determined by the procedure in Examples 1-4 are also presented in Table III.

TABLE III

| Components | Parts by weight | | |
|---|---|---|---|
| | Examples | | |
| | 5 | 6 | 7 |
| Polyether polyol | 100 | 75 | 50 |
| Oxypropylated glycerin | 0 | 25 | 50 |
| Oxyethylated nonyl phenol | 30 | 30 | 30 |
| Stannous octoate | 0.05 | 0.10 | 0.15 |
| Triethylene diamine (33% in dioctyl phthalate) | 0.20 | 0.20 | 0.20 |
| Silicone oil surfactant [1] | 1.50 | 1.50 | 1.50 |
| Water | 4.0 | 4.0 | 4.0 |
| Toluene diisocyanate (80-20 of 2,4 and 2,6-isomers) | 48.8 | 48.8 | 48.8 |

| Property | Examples | | |
|---|---|---|---|
| | 5 | 6 | 7 |
| Density, lbs. per cubic foot | | | |
| Water pickup, grams of water per cubic inch of foam | 15.4 | 8.9 | 9.4 |
| Wipeability | Good | Good | Fair |

[1] A block copolymer of a dimethyl polysiloxane and a polyalkylene oxide.

EXAMPLES 8-10

The procedure of Examples 1-4 was repeated with the exception that the polyether polyol was obtained by random oxyalkylation of glycerin with a mixture of ethylene oxide and propylene oxide to a molecular weight of 2,000 which was approximately two-thirds of the final molecular weight. The resulting oxyalkylated material was then oxypropylated to a final molecular weight of 3,000 and a hydroxyl number of 56. The total weight of ethylene oxide in the polyol was 40 percent.

The proportion of polyether polyol and oxyethylated nonyl phenol and other ingredients, as well as properties of the resulting foam, are presented below in Table IV.

TABLE IV

| Component | Parts by weight | | |
|---|---|---|---|
| | Examples | | |
| | 8 | 9 | 10 |
| Polyether polyol | 100 | 100 | 100 |
| Oxyethylated nonyl phenol | 10 | 20 | 30 |
| Stannous octoate | 0.18 | 0.18 | 0.24 |
| Triethylene diamine (33% in dioctyl phthalate) | 0.10 | 0.10 | 0.10 |
| Silicone oil surfactant [1] | 1.5 | 1.5 | 1.5 |
| Water | 4.0 | 4.0 | 4.0 |
| Toluene diisocyanate (80-20 of 2,4 and 2,6-isomers) | 46.2 | 46.2 | 62 46.2 |

| Property | Examples | | |
|---|---|---|---|
| | 8 | 9 | 10 |
| Water pickup, grams of water per cubic inch of foam | 11.9 | 14.4 | 14.4 |
| Wipeability | Fair | Fair | Good |

[1] A block copolymer of a dimethyl polysiloxane and a polyalkylene oxide.

Various modifications of the invention, some of which have been referred to above, may be made without departing from the spirit of the invention. What is desired to be secured by Letters Patent is:

1. The process for preparing a hydrophilic polyurethane foam which comprises reacting in a one-shot technique
   (a) toluene diisocyanate with
   (b) an oxyalkylated polyether comprising a mixture of
      (1) oxyalkylated glycerine containing between about 30 and about 50 percent by weight of oxyethylene and between about 50 and about 70 percent by weight of oxypropylene substituents, and
      (2) oxyethylated nonyl phenol containing between about 6 and about 35 moles of ethylene oxide per mole of nonyl phenol in the presence of
   (c) a mixture of stannous octoate and triethylene diamine,
   (d) water, and
   (e) a silicone surfactant,
   (f) the proportion of said oxyethylated nonyl phenol comprising between about 5 and about 40 percent by weight of the mixture of said oxyalkylated glycerine and said oxyethylated nonyl phenol.
2. The hydrophilic polyurethane foam composition produced by the process of claim 1.

References Cited

UNITED STATES PATENTS

| | | | |
|---|---|---|---|
| 2,977,330 | 3/1961 | Brower | 260—2.5 |
| 3,098,048 | 7/1963 | Shelanski et al. | 260—2.5 |

FOREIGN PATENTS

| | | |
|---|---|---|
| 874,766 | 8/1961 | Great Britain. |
| 879,166 | 11/1963 | Great Britain. |
| 982,776 | 3/1962 | Great Britain. |

OTHER REFERENCES

Saunders et al.—Polyurethanes: Chemistry and Technology, Part II—Technology Interscience, Publishers, New York, 1964, p. 173, lines 4–9, Section 9.

DONALD E. CZAJA, Primary Examiner

H. S. COCKERAM, Assistant Examiner

U.S. Cl. X.R.

260—77.5